United States Patent [19]

Saito

[11] 4,337,821
[45] Jul. 6, 1982

[54] AIR CONDITIONER SYSTEM FOR AUTOMOBILES

[75] Inventor: Atsunori Saito, Kariya, Japan

[73] Assignee: Nippondenso Co., Ltd., Kariya, Japan

[21] Appl. No.: 96,554

[22] Filed: Nov. 21, 1979

[30] Foreign Application Priority Data

Nov. 28, 1978 [JP] Japan .............................. 53/147576
Sep. 12, 1979 [JP] Japan .............................. 54/117507

[51] Int. Cl.³ ............................................. F25B 29/00
[52] U.S. Cl. ..................................... 165/12; 165/28;
165/42; 236/91 G; 237/12.3 A
[58] Field of Search ..................... 165/28, 32, 30, 14,
165/42, 43, 26, 12; 237/12.3 A; 236/49, 91 G,
91 R, 91 E; 62/239, 243, 244; 340/57, 600;
73/339 C, 355 R, 362 AR

[56] References Cited

U.S. PATENT DOCUMENTS

| | | | |
|---|---|---|---|
| 2,346,560 | 4/1944 | Crosthwait et al. | 236/91 G |
| 2,375,988 | 5/1945 | Gille et al. | 165/28 |
| 2,782,996 | 2/1957 | Sparrow | 236/91 G |
| 3,768,059 | 10/1973 | Day | 236/91 R |
| 3,801,008 | 4/1974 | Wenger | 236/49 |
| 4,024,725 | 5/1977 | Uchida et al. | 236/91 G |
| 4,058,254 | 11/1977 | Hallgreen | 73/339 C |
| 4,147,205 | 4/1979 | Bata et al. | 165/26 |

FOREIGN PATENT DOCUMENTS 2219897 10/1973 Fed. Rep. of Germany ... 236/91 G

Primary Examiner—Albert W. Davis
Assistant Examiner—Margaret A. Focarino
Attorney, Agent, or Firm—Cushman, Darby & Cushman

[57] ABSTRACT

An air conditioner system for automotive vehicles comprises a device for detecting the temperature of an inner part of the compartment of a vehicle which is exposed to the radiant heat of the sun, a device for detecting the temperature of another inner part of the compartment which is unexposed to the radiant heat of the sun, and a control unit whereby the difference between the temperature of the part exposed to the radiant heat of the sun and that of the part unexposed to the radiant heat of the sun is obtained and in accordance with this temperature difference and the desired preset temperature of amounts of heated and cooled air blown into the vehicle compartment are controlled so as to cause the temperature in the compartment to approach the preset value. The system further comprises a device for detecting the closed position of an on-off damper which controls the flow of air through the defroster air outlet whereby the control unit is operated in response to the closed position of the damper.

4 Claims, 6 Drawing Figures

4,337,821

AIR CONDITIONER SYSTEM FOR AUTOMOBILES

BACKGROUND OF THE INVENTION

This invention relates to air conditioner systems for vehicles which are capable of adjusting the temperature of blown-off air, and more particularly the invention relates to an air conditioner system so designed that the amount of temperature adjustment is corrected in accordance with the light quantity of the sun incident to a vehicle.

SUMMARY OF THE INVENTION

It is an object of the invention to provide an air conditioner system for a vehicle in which the temperature of a vehicle compartment part exposed to the light of the sun and the temperature of another compartment part are detected to obtain the difference therebetween and the light quantity of the sun incident to the vehicle is determined from the difference so as to correct the amount of temperature adjustment and thereby to stably maintain the compartment temperature at a constant value without being influenced by the incident light of the sun.

It is another object of the invention to provide an air conditioner system in which a first temperature sensor is disposed on the instrument panel of a vehicle at a position where it is substantially exposed to the light of the sun transmitted through the front windshield glass of the compartment so as to detect the temperature of a compartment part exposed to the light of the sun whereby this detected value is compared with the detected value of a second temperature sensor disposed in the compartment at a position which is practically unexposed to the light of the sun so as to determine the proper amount of adjustment in accordance with the difference between the detected values, and the determined amount of correction is maintained so long as the defroster air outlet facing the front windshield glass is held open, thereby properly correcting the amount of temperature adjustment without the first temperature sensor being influenced by the temperature of the air blown-off from the defroster outlet.

DESCRIPTION OF THE PREFERRED EMBODIMENTS

The present invention will now be described in greater detail with reference to the illustrated embodiments.

Figure 1:
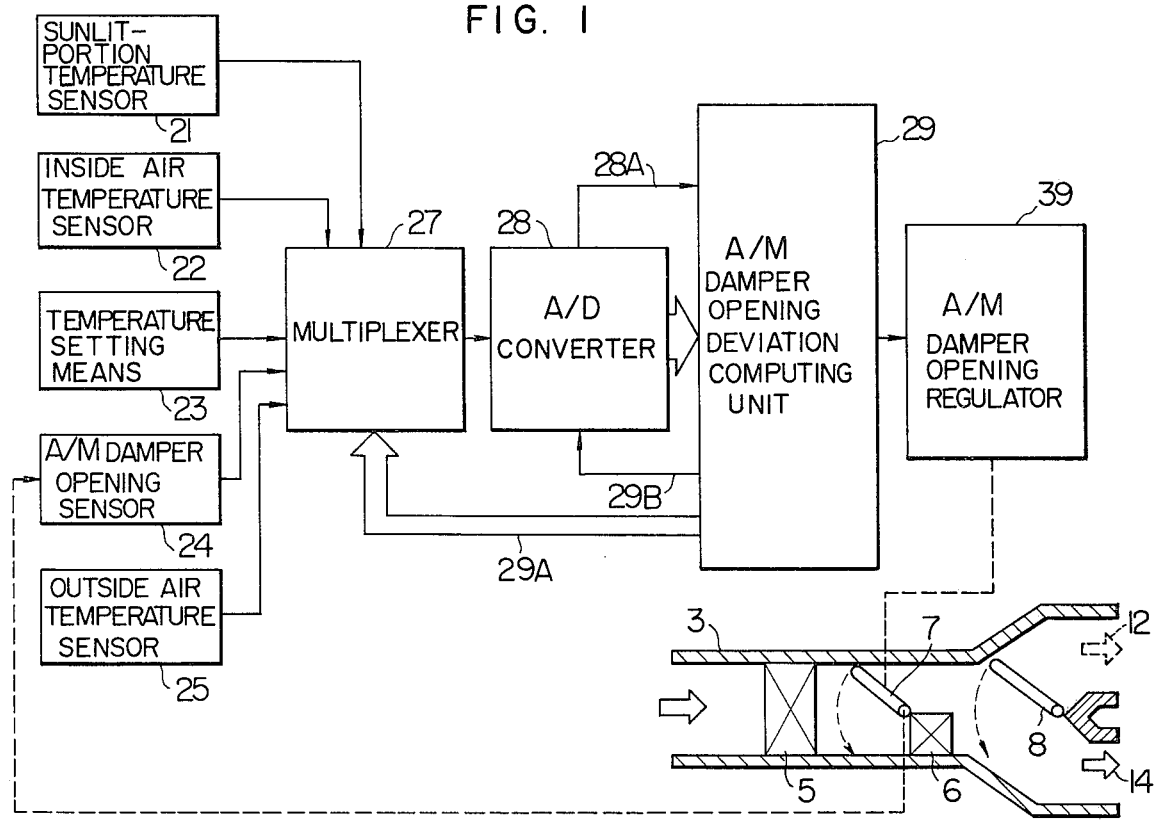
FIG. 1 is a partially schematic block diagram showing a first embodiment of an air conditioner system in accordance with the present invention.
Figure 2:
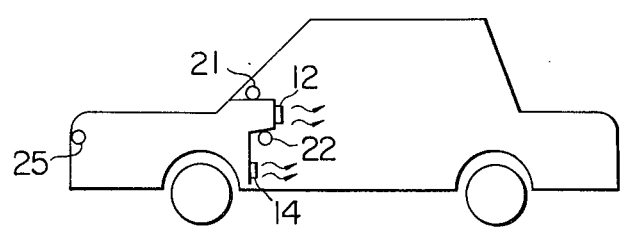
FIG. 2 is a schematic diagram showing the positions where the sunlit temperature detecting sensor and the inside air temperature detecting sensor shown in FIG. 1 are mounted.

Referring first to FIG. 1 showing a first embodiment of an air conditioner system according to the invention, numeral 21 designates a sunlit-portion temperature detecting sensor comprising for example a thermistor for detecting the temperature $T_1$ of a vehicle compartment part exposed to the incident light of the sun (the radiant heat of the sun), and the sensor 21 is disposed at a position inside the compartment, such as, the upper part of the instrument panel which is considered most liable to be exposed to the light of the sun or the radiant heat of the sun directly (through the glass of the vehicle) as shown in FIG. 2. Numeral 22 designates an inner air temperature detecting sensor comprising for example a thermistor for detecting the temperature $T_2$ of another vehicle compartment part which is not exposed to the radiant heat of the sun, and the sensor 22 is disposed at a portion such as a position between an upper air outlet 12 and a lower air outlet 14 which is not exposed to the radiant heat of the sun and considered to practically represent the temperature within the vehicle compartment. Numeral 23 designates a temperature setting means for setting a desired inside air temperature $T_d$, 24 an air mix damper opening sensor for detecting the opening position $T_{P0}$ of an air mix damper 7 (temperature adjustor) for adjusting the temperature of the air blown off from the air outlets (the outlets 12 and 14 of FIG. 2) of a known air conditioner system of the cooled and heated air mixing type, and 25 an outside air temperature detecting sensor comprising for example a thermistor for detecting the temperature $T_{am}$ of the air outside the vehicle compartment, the sensor 25 being disposed for example on the front part of the vehicle as shown in FIG. 2. Numeral 27 designates a multiplexer responsive to the selection signal 29A from an air mix damper opening deviation computing unit 29 to sequentially deliver to an A/D converter 28 the analog signals from the sunlit-portion temperature detecting sensor 21, the inner air temperature detecting sensor 22, the air mix damper opening sensor 24 and the outside air temperature detecting sensor 25. The A/D converter 28 is responsive to the A/D conversion start signal 29B from the air mix damper opening deviation computing unit 29 to convert the analog signals from the multiplexer 27 into digital signals and upon completion of the A/D conversion a termination signal 28A is applied to the air mix damper opening deviation computing unit 29. In accordance with the output signals of the A/D converter 28 including the signal indicative of the sunlit-portion temperature $T_1$, the signal indicative of the inside air temperature $T_2$, the signal indicative of temperature $T_d$ preset by the temperature setting means 23, the signal indicative of the opening amount $T_{p0}$ of the air mix damper 7 and the signal indicative of the outside air temperature $T_{am}$, the air mix damper opening deviation computing unit 29 computes the opening deviation or amount of movement of the air mix damper 7 required for causing the inside air temperature $T_c$ which is estimated from these input conditions to approach the preset temperature $T_d$. Numeral 39 designates an air mix damper opening controller comprising a negative pressure actuator and an electromagnetic valve, whereby in accordance with the opening deviation of the air mix damper 7 computed by the air mix damper opening deviation computing unit 29 the electromagnetic valve is opened or closed to control the negative pressure actuator and thereby to move and adjust the position of the air mix damper 7. Numeral 8 designates an outlet selector damper for closing one or the other of the upper and lower air outlets. Numeral 6 designates a heater for raising the temperature of the air passing therethrough, and 5 a cooler for lowering the temperature of the air passing therethrough. Numeral 3 designates an air duct for directing the inside air or the outside air to the air outlets 12 or 14.

Figure 3:
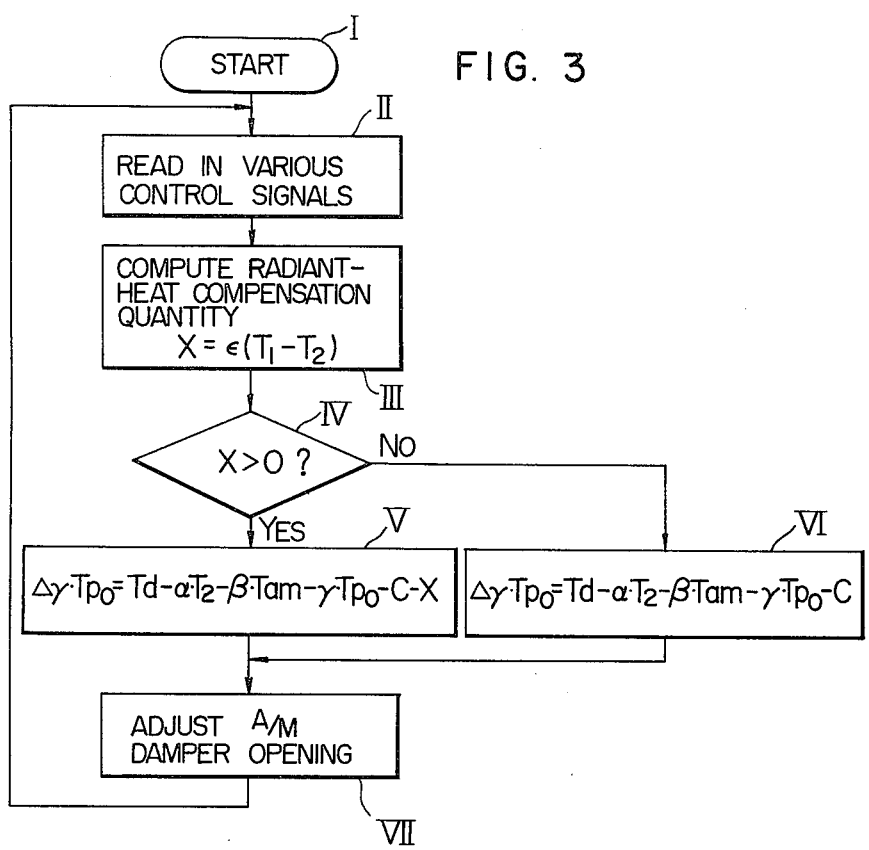
FIG. 3 is a computation flow chart useful for explaining the operation of the embodiment shown in FIG. 1.

The operation of the above-described embodiment will now be described with reference to the computing flow chart shown in FIG. 3. At the start or in a step I, the computation is started and then the computation proceeds to a step II to read in the various control signals. In the step II, the various control signals including the signal indicative of the sunlit-portion temperature $T_1$, the signal indicative of the inside air temperature $T_2$, the signal indicative of the preset temperature $T_d$ of the temperature setting means 23, the signal indicative of the opening $T_{PO}$ of the air mix damper 7 and the signal indicative of the outside air temperature $T_{am}$ are sequentially selected by the multiplexer 27, are converted into the corresponding digital signals by the A/D converter 28 and then written into the random access memory (RAM) incorporated in the air mix damper opening deviation computing unit 29. In the next step III, a radiant-heat compensation term $X = \epsilon \cdot (T_1 - T_2)$ is computed by the central processing unit (CPU) in the air mix damper opening deviation computing unit 29. Here $\epsilon$ is a positive constant. In a step IV, the CPU determines whether the radiant-heat compensation term X is greater or smaller than zero. When $X \leq 0$, it is judged that there is no radiant-heat of the sun and the compensation term is set to $X = 0$. When the step IV results in $X > 0$, the computation proceeds in the direction of YES and in a step V the opening deviation $\Delta \gamma T_{PO}$ of the air mix damper 7 is computed by the CPU. In this embodiment, the following equation is used $$\Delta \gamma T_{PO} = T_d - T_c \quad (1)$$
$$= T_d - (\alpha T_2 + \beta T_{am} + \gamma T_{PO} + C + X)$$

where $T_d$ is the preset temperature, $T_c$ the estimated inside air temperature, $T_2$ the inside air temperature, $T_{am}$ the outside air temperature, $T_{PO}$ the opening amount of the air mix damper 7, X the radiant-heat compensation term, and $\alpha$, $\beta$, $\gamma$ and C predetermined constants. On the contrary, when the step IV results in $X \leq 0$ so that the computation proceeds in the direction of NO, in the similar manner as mentioned previously the opening deviation $\Delta \gamma T_{PO}$ of the air mix damper 7 is computed by the CPU in the next step VI. The following equation is used for this computation.

$$\Delta \gamma T_{PO} = T_d - T_c \quad (2)$$
$$= T_d - (\alpha T_2 + \beta T_{am} + \gamma T_{PO} + C)$$

The symbols are identical with those of the equation (1). This equation differs from the equation (1) in that the radiant-heat compensation term X is eliminated, since the radiant-heat of the sun is considered nonexisting when $X \leq 0$. In the next step VII, the opening of the air mix damper 7 is adjusted by the air mix damper opening regulator 39 in accordance with the value of the $\Delta \gamma T_{PO}$ computed in the step V or VI. In other words, if, for example, $\Delta \gamma T_{PO} > 0 + \delta$, then it is predicted that the inside air temperature $T_2$ becomes lower than the preset temperature $T_d$ and consequently the air mix damper 7 is rotated clockwise in FIG. 1 so as to increase the amount of the air passing through the heater 6. Here the constant $\delta$ (0.5, for example) is the hysteresis applied to the air mix damper opening regulator 39, so that when $0 \leq \Delta \gamma T_{PO} \leq +\delta$ the air mix damper 7 is not rotated and it is held in the existing position. On the contrary, when $\Delta \gamma T_{PO} < 0$ so that it is predicted that the inside air temperature $T_2$ becomes higher than the preset temperature $T_d$, the air mix damper 7 is rotated counterclockwise in FIG. 1 and the amount of the air passing through the heater 6 is decreased. At the end of the step VII for adjusting the opening amount of the air mix damper 7, the computation is returned to the step II for reading in the various control signals and the similar computational operations as previously mentioned are repeated so that the inside air temperature $T_2$ is caused with a good response to approach the preset temperature $T_d$ and the inside air temperature $T_2$ is maintained substantially at the preset temperature $T_d$.

While, in this embodiment, only the single sunlit-portion temperature detecting sensor 21 is mounted on the upper part of the instrument panel in the vehicle compartment, a plurality of units of the sunlit-portion temperature detecting sensor may be mounted in other inner parts of the compartment which are liable to be exposed to the radiant heat of the sun so as to accomplish the radiant-heat compensation or correction with a greater accuracy. In this case, it is only necessary to use the signal from the sensor detecting the highest temperature or the average value of the signals from the plurality of sunlit-portion temperature detecting sensors.

Further, while, in the above-described embodiment, the signals from the sensors are processed by means of the digital circuit, the signals may be processed by means of an analog circuit so as to adjust the opening of the air mix damper 7.

Figure 4:
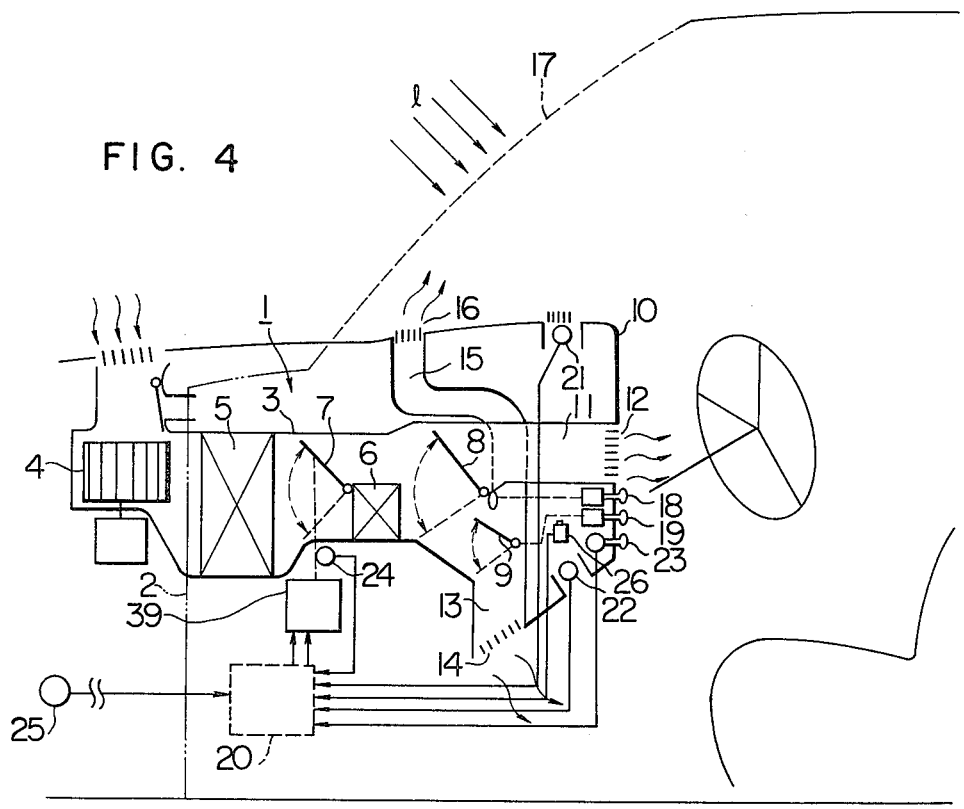
FIG. 4 is a schematic diagram showing a second embodiment of the system according to the invention.

A second embodiment of the invention will now be described with reference to FIG. 4 showing the overall arrangement of the component parts of the second embodiment. In the Figure, the same reference numerals as used in FIG. 1 designate the identical or equivalent component parts and a known type of air conditioner unit 1 is disposed at the back of an instrument panel 10 of a vehicle. The air conditioner unit 1 comprises an air duct 3 extended through a dash board 2 and disposed inside the air duct 3, an electric blower 4, a cooling heat exchanger (cooler) 5, a heating heat exchanger (heater) 6, an air mix damper 7 (A/M damper) and dampers 8 and 9 for changing the directions of air flow. The upstream side of the air duct 3 is opened to both the outside and inside the vehicle compartment and the downstream side is branched and connected to blow-off ducts 11, 13 and 15 having the other ends thereof respectively opened to the compartment as an upper air outlet 12 positioned in front of the instrument panel 10, a lower air outlet 14 positioned below the instrument panel 10 and a defroster air outlet 16 positioned in the upper surface of the instrument panel 10 to face a front windshield glass 17. The damper 8 is adapted to open and close the blow-off duct 11 communicating with the upper air outlet 12 and the other blow-off ducts 13 and 15 and it is adjustable into any desired open or closed position by the vehicle occupant by means of an adjusting lever 18. The damper 9 is adapted to open and close the blow-off duct 13 communicating with the lower air outlet 14 and the blow-off duct 15 communicating with the defroster air outlet 16 and the damper 9 is opened and closed by means of a selector lever 19. The damper 9 is also adapted not to fully close the blow-off duct 15 so that a small amount of the air is blown off from the defroster air outlet 16 even when the air is being blown off from the lower air outlet 14.

The A/M damper 7 is designed so that the proportion of the air cooled by the cooling heat exchanger 5 and passed through the heating heat exchanger 6 is varied so as to vary the temperature of the blown-off air. A regulator such as negative pressure actuator or controller 39 of the solenoid valve controlled type is coupled to the A/M damper 7 so as to determine the position of the A/M damper 7 in response to the command signal from an electric control unit 20.

The electric control unit 20 is designed so that it is responsive to the signals from temperature sensors 21, 22 and 25 disposed at various parts of the vehicle and the signals from a temperature setting means 23, opening sensor 24 and a switch 26 so as to determine the amount of temperature adjustment required to maintain the temperature in the compartment at a value preset by the setting means 23. The output signals of the control unit 20 are applied to the negative pressure actuator regulator 39.

The first temperature sensor 21 is mounted on the upper surface of the instrument panel 10 at a position exposed direct to a light l of the sun transmitted through the front wind-shield glass 17. This position is close to the occupants, particularly the occupants in the front seats and is well suited to be exposed to the thermal effect of the incident sunlight which is about the same as the occupants will be exposed to. The second temperature sensor 22 is disposed at a position which is practically unexposed to the incident light of the sun and where the detected temperature substantially represents the average temperature in the compartment. For instance, the second temperature sensor 22 is disposed at a position which is substantially intermediary of the upper air outlet 12 and the lower air outlet 14 and is not exposed direct to the air blown off from these outlets. The third temperature sensor 25 is provided to detect the temperature outside the compartment and it is positioned in front of the engine cooling radiator. The temperature sensors 21, 22 and 25 each comprises a heat responsive resistant element such as a thermistor whereby when a fixed current is supplied to the sensor, a temperature-dependent voltage signal is generated.

The temperature setting means 23 comprises a variable resistor having an operating lever and it generates a voltage signal corresponding to the position preset by the occupant. The opening detector 24 comprises a variable resistor having its movable contact connected to the output rod (not shown) of the negative pressure actuator regulator 39 and it generates a voltage signal corresponding to the position of the A/M damper 7.

The sensing switch 26 includes a movable contact operatively associated with a link mechanism coupling the selector 19 to the damper 9 and the movable contact is brought into contact with a fixed contact when the blow-off duct 15 communicating with the defroster air outlet 16 is practically opened fully by the damper 9.

Figure 5:
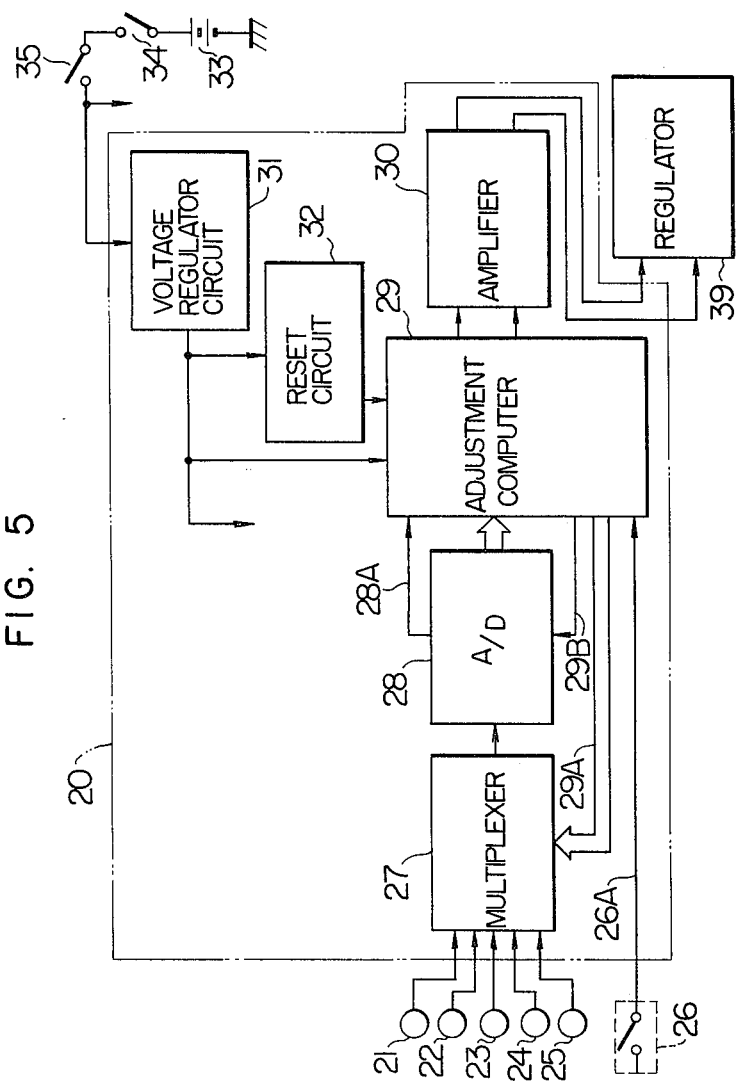
FIG. 5 is a block diagram showing in detail the component parts of the electric control unit used in the second embodiment of FIG. 4.

FIG. 5 shows in detail the construction of the electric control unit 20. In the Figure, numeral 27 designates a multiplexer responsive to the selection signal 29A from a computer 29 so as to selectively deliver to an A/D converter 28 the voltage signals from the first, second and third temperature sensors 21, 22 and 25, the temperature setting means 23 and the opening sensor 24. The A/D converter 28 is responsive to the A/D conversion start signal 29B from the computer 29 to convert the voltage signals from the multiplexer 27 into the corresponding digital signals and upon completion of the A/D conversion a termination signal 28A is applied to the computer 29. The computer 29 comprises a so-called microcomputer which is programmed so that in accordance with the digital signals generated from the A/D converter 28 and the on-off signal from the switch 26, the computer computes by a digital computation the amount of position adjustment for the A/M damper 7 which is required to cause the compartment temperature corresponding to the detected data of the second temperature sensor 23 to approach the preset temperature. The computer 29 applies the result of the computation to an amplifier 30 whose amplified output signal is applied to the regulator 39.

The electric control unit 20 further comprises a voltage regulator circuit 31 for supplying a constant voltage to the previously mentioned internal circuits and a reset circuit 32 for initially setting the computer 29 in response to the supply of the constant voltage. The actuating voltage for the system is supplied from a vehicle battery 33 by way of a key switch 34 and a main switch 35. When the key switch 34 and the main switch 35 are closed, the power is supplied to energizing means (not shown) for operating the control unit 20, the blower motor 4 and the heat exchangers 5 and 6 and the air conditioner system is brought into operation.

Figure 6:
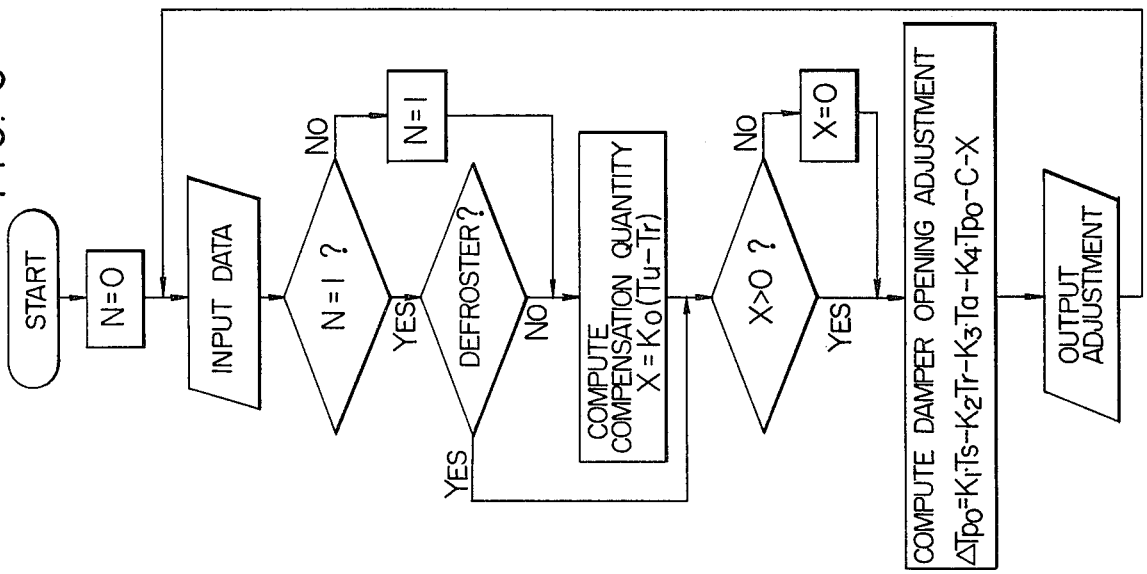
FIG. 6 is a computation flow chart useful in explaining the operation of the embodiment shown in FIG. 4.

FIG. 6 shows the sequence of computational operations performed by the computer 29. When the switches 34 and 35 are closed, the computer 29 is brought into operation and its initial value N is first set to zero. Then, the multiplexer 27 and the A/D converter 28 are brought into operation so that the voltage signals from the temperature sensors 21, 22 and 25, the temperature setting means 23 and the opening detector 24 are successively converted into the corresponding digital signals and the data are stored at the associated addresses of the inner memory. In the following description, of the data thus stored the data corresponding to the detection signal of the first temperature sensor 21 is designated as an upper temperature $T_u$, the data corresponding to the detection signal of the second temperature sensor 22 as a representative compartment temperature $T_r$ and the data corresponding to the detection signal of the third temperature sensor 25 as an outside air temperature $T_a$.

Also the data corresponding to the preset signal of the temperature setting means 23 is designated as a preset temperature $T_s$ and the data corresponding to the detection signal of the opening sensor 24 as a damper opening amount $T_{PO}$.

The computer 29 includes an operation whereby whether the blow-off duct 15 leading to the defrostor air outlet 16 is being opened (YES) or not (NO) by the damper 9 is determined in accordance with the level of the on-off signal 26A from the switch 26. When it is determined that the blow-off duct 15 is being closed, the computation of compensation quantity is performed. Just after the electric control unit 20 starting to operate, the computation of compensation quantity is effected irrespective of the result of the determination. In other words, even though the blow-off duct 15 is open, if practically no air is being blown off from the defroster air outlet 16, the first temperature sensor 21 will not be influenced by the temperature of the air blown off from the defroster air outlet 16.

A data X indicative of the compensation quantity is obtained by multiplying the difference between the upper temperature $T_u$ and the representative compartment temperature $T_r$ by a predetermined constant $K_0$. When the compensation quantity data X has a negative value, the compensation quantity data X will be set to zero for the following processing. This is due to the fact that when the upper temperature $T_u$ is lower than the representative compartment temperature $T_r$, it is considered that practically there is no thermal effect of the radiant heat of the sun on the vehicle.

Then, the computer 29 computes the desired position adjustment data $\Delta T_{P0}$ for the A/M damper 7 from the compensation quantity data X and other control parameters. Used for the purpose of this computation are the illustrated equations programmed so as to bring the representative compartment temperature $T_r$ near to the preset temperature $T_s$ without being influenced by the thermal effects of the outside air temperature $T_a$ and the incident light l of the sun, and of the constants $K_1$, $K_2$, $K_3$ and C used the constants $K_1$, $K_2$, $K_3$ and $K_4$ represent the predetermined weights of the control systems for the control parameters $T_s$, $T_r$, $T_a$ and $T_{P0}$.

The thus obtained result of the computation or the adjustment data $\Delta T_{P0}$ is converted to a command signal for varying the position of the A/M damper 7 and it is then applied to the amplifier 30. In other words, depending on whether the adjustment data $\Delta T_{P0}$ has a positive sign or a negative sign, a signal is generated which is indicative of the desired direction of movement of the A/M damper 7.

The functions of the electric control unit 20 may be summarized as follows. Namely, the computer 29 repeatedly performs the above-mentioned computational operations so as to apply command signals to the solenoid valve controlled negative pressure actuator regulator 39 and thereby to cause the adjustment data $\Delta T_{P0}$ to gradually approach zero. The A/M damper 7 adapted to be moved by the negative pressure actuator regulator 39 is always controlled at the proper position for bringing the representative compartment temperature $T_r$ near to the preset temperature $T_s$.

In this case, the adjustment data $\Delta T_{P0}$ is computed by taking account of the compensation quantity X corresponding to the difference between the upper temperature $T_u$ and the representative compartment temperature $T_r$. Since the upper temperature $T_u$ gets higher than the representative compartment temperature $T_r$ when there is a temperature rise at the instrument panel 10 due to the incident light l of the sun, the compensation quantity X has a value indicative of the thermal intensity of the incident light. As a result, the representative compartment temperature $T_r$ is controlled without being varied by the thermal effect of the incident light l of the sun.

Depending on the choice of the occupants, the openings of the dampers 8 and 9 are varied by means of the adjusting lever 18 and the selector lever 19. When the switch 26 detects that the upstream side of the blow-off duct 15 has been opened by the damper 9, the electric control unit 20 interrupts the computation of compensation quantity data X by the computer 29. The previously computed compensation quantity data X is stored as such in the memory of the computer 29 and the computer 29 computes the adjustment data $\Delta T_{P0}$ in accordance with the stored value. As a result, the first temperature sensor 21 being influenced by the temperature of the blown-off air from the defroster air outlet 16 and thereby causing the upper temperature $T_u$ corresponding to its detection signal to fail to show the proper value is masked. As long as the defroster air outlet 16 is open, it is considered that the thermal intensity of the radiant heat is not changed and the conditioner system continues to adjust the compartment temperature correspondingly. When the defroster air outlet 16 is closed, the desired compensation quantity X is computed again and the adjustment of the compartment temperature is effected in response to the thermal intensity of the radiant heat of the sun at each time.

Although the invention has been described with reference to the preferred embodiment thereof, many changes and modifications may be made thereto.

For instance, a plurality of units of the temperature sensor adapted to be substantially exposed to the incident light of the sun may be placed at a plurality of positions including the one on the instrument panel 10, so that one of the resulting detected data indicative of the highest temperature or the average value of the detected data is compared with the representative compartment temperature and the amount of adjustment of the temperature adjusting means is compensated in accordance with the difference between the temperatures. In this case, it is of course necessary to store only the detected data of the temperature sensor disposed on the instrument panel so long as the defroster air outlet is open.

Further, where the opening and closing of the damper 9 are selected by electric drive means and an electric switch is used as a command switch for effecting the selection, the function of the sensing switch 26 may be performed by the electric switch. Further, circuit means may be added so as to delay the application of the on-off signal from the switch 26 to the computer 29. This has a masking effect in that when the defroster air outlet 16 which has been opened by the damper 9 is closed by the latter, the temperature near the upper surface of the instrument panel 10 is prevented from assuming any undesirable value for a certain period of time.

It will thus be seen from the foregoing that the present invention has a great advantage that the thermal intensity of the incident light of the sun is detected accurately so as to adjust the vehicle compartment temperature without being influenced by the radiant heat of the sun.

What is claimed is:

1. In an air conditioner system for vehicles including air duct means communicated with a vehicle compartment, cooler means disposed in said air duct means for supplying cooled air, heater means disposed in said air duct means for supplying heated air, damper means adjustably disposed in said air duct means for controlling the ratio between said cooled air and said heated air which are supplied to said vehicle compartment through said air duct means, and control means for adjusting the position of said damper means such that the temperature in said vehicle compartment approaches a desired compartment temperature value, the improvement comprising:

first temperature responsive means disposed in said vehicle compartment to be directly responsive to the radiant heat of the sun and effective to produce a first output signal indicative of the temperature present thereat;

second temperature responsive means disposed, in said vehicle compartment to be irresponsive to the radiant heat of the sun and effective to produce a second output signal indicative of the temperature present thereat;

means responsive to said first output signal and said second output signal and effective to provide a solar radiation value in proportion to the difference between said output signals;

means responsive to said second output signal and said solar radiation value and effective to produce an estimated compartment temperature value by correcting said second output signal by at least said solar radiation value only when said first output signal exceeds said second output signal; and means responsive to said desired compartment temperature value and said estimated compartment temperature value and effective to actuate said control means in response to the deviation of said estimated compartment temperature value from said desired compartment temperature value.

2. In an air conditioner system for vehicles including air duct means communicated with a vehicle compartment through at least a defroster outlet facing the front windshield glass of a vehicle, cooler means disposed in said air duct means for supplying cooled air, heater means disposed in said air duct means for supplying heated air, first damper means adjustably disposed in said air duct means for controlling the ratio between the cooled air and the heated air which are supplied to said vehicle compartment through said air duct means, second damper means adjustably positioned in said air duct means for opening and closing said defroster outlet, and control means for adjusting the position of said first damper means such that the temperature in said vehicle compartment approaches a desired compartment temperature, the improvement comprising:

first temperature responsive means disposed close to said defroster outlet in said vehicle compartment to be directly responsive to the radiant heat of the sun passing through said front windshield glass and effective to produce a first output signal indicative of the temperature present thereat;

second temperature responsive means disposed apart from said defroster outlet in said vehicle compartment to be irresponsive to the radiant heat of the sun and effective to produce a second output signal indicative of the temperature present thereat; and means responsive to the position of said second damper means and effective to derive a difference between said first output signal and said second output signal only when said second damper means is positioned to close said defroster outlet, so that said control means adjusts the position of said first damper means in response to said derived difference.

3. In an air conditioner system for vehicles including air duct means communicated with a vehicle compartment through at least a defroster outlet facing the front windshield glass of a vehicle, cooler means disposed in said air duct means for supplying cooled air, heater means disposed in said air duct means for supplying heated air, first damper means adjustably disposed in said air duct means for controlling the ratio between the cooled air and the heated air which are supplied to said vehicle compartment through said air duct means, second damper means adjustably positioned in said air duct means for opening and closing said defroster outlet, and control means for adjusting the position of said first damper means such that the temperature in said vehicle compartment approaches a desired compartment temperature, the improvement comprising:

first temperature responsive means disposed close to said defroster outlet in said vehicle compartment to be directly responsive to the radiant heat of the sun passing through said front windshield glass and effective to produce a first output signal indicative of the temperature present thereat;

second temperature responsive means disposed apart from said defroster outlet in said vehicle compartment to be irresponsive to the radiant heat of the sun and effective to produce a second output signal indicative of the temperature present thereat;

means responsive to the position of said second damper means and effective to derive a difference between said first output signal and said second output signal only when said second damper means is positioned to close said defroster outlet;

means effective to store said derived difference when said second damper means is positioned to open said defroster outlet; and means effective to actuate said control means in accordance with said derived difference and said stored difference when said second damper means is positioned to close and open said defroster outlet, respectively.

4. In an air conditioner system for vehicles including air duct means communicated with a vehicle compartment through at least a defroster outlet facing the front windshield glass of a vehicle, cooler means disposed in said air duct means for supplying cooled air, heater means disposed in said air duct means for supplying heated air, first damper means adjustably disposed in said air duct means for controlling the ratio between the cooled air and the heated air which are supplied to said vehicle compartment through said air duct means, second damper means adjustably positioned in said air duct means for opening and closing said defroster outlet, and control means for adjusting the position of said first damper means such that the temperature in said vehicle compartment approaches a desired compartment temperature, the improvement comprising:

first temperature responsive means disposed close to said defroster outlet in said vehicle compartment to be directly responsive to the radiant heat of the sun passing through said front windshield glass and effective to produce a first output signal indicative of the temperature present thereat;

second temperature responsive means disposed apart from said defroster outlet in said vehicle compartment to be irresponsive to the radiant heat of the sun and effective to produce a second output signal indicative of the temperature present thereat;

third temperature responsive means disposed outside said vehicle compartment and effective to produce a third output signal indicative of the ambient temperature thereat;

means responsive to said first output signal and said second output signal and effective to provide a solar radiation value in proportion to the difference between said first and second output signals only when said second damper means is positioned to close said defroster outlet and said first output signal exceeds said second output signal;

means effective to store said solar radiation value when said second damper means is positioned to open said defroster outlet;

means effective to provide an estimated compartment temperature value by correcting said second output signal by said third output signal and either one of said solar radiation value and said stored solar radiation value; and means responsive to said desired compartment temperature value and said estimated compartment temperature value and effective to actuate said control means in response to the deviation of said estimated compartment temperature value from said desired compartment temperature value.

* * * * *